United States Patent
Niemerg et al.

[11] Patent Number: 5,996,307
[45] Date of Patent: Dec. 7, 1999

[54] DEVICE FOR LOADING BALE WRAPPING ROLLS

[75] Inventors: Heinz Niemerg, Harsewinkel; Markus Wiefel, Beelen, both of Germany

[73] Assignee: CLAAS KGaA, Harsewinkel, Germany

[21] Appl. No.: 09/041,559

[22] Filed: Mar. 12, 1998

[30] Foreign Application Priority Data

Mar. 18, 1997 [DE] Germany .......................... 197 11 164

[51] Int. Cl.⁶ .................................................. B65B 63/04
[52] U.S. Cl. ............................................. 53/118; 53/587
[58] Field of Search ............................. 53/118, 399, 430, 53/441, 450, 567, 587, 389.1, 389.2, 389.4; 56/341, 343

[56] References Cited

U.S. PATENT DOCUMENTS

| | | | |
|---|---|---|---|
| 4,569,439 | 2/1986 | Freye et al. | 206/83.5 |
| 4,677,807 | 7/1987 | Veihulst et al. | 53/118 |
| 4,691,503 | 9/1987 | Frerich | 53/587 |
| 5,181,368 | 1/1993 | Anstey et al. | 53/587 |
| 5,433,059 | 7/1995 | Kluver et al. | 53/399 |
| 5,450,704 | 9/1995 | Clostermeyer | 53/118 |

FOREIGN PATENT DOCUMENTS

| | | | |
|---|---|---|---|
| 3429203A1 | 2/1986 | Germany | A01F 15/14 |
| 3941727A1 | 6/1991 | Germany | B65F 9/00 |
| 9211541U1 | 12/1992 | Germany | A01F 15/07 |

*Primary Examiner*—Joseph J. Hail, III
*Assistant Examiner*—Ed Tolan
*Attorney, Agent, or Firm*—Husch & Eppenberger, LLC; Robert E. Muir

[57] ABSTRACT

A round baler for baling harvested crops has a loading device which receives a roll of wrapping material which can be transferred to an unwind station. From the unwind station a web of material is pulled off the roll for wrapping the bale. To install the roll of wrapping material serviceably and without great effort, the loading device is pivotably installed on the baler's sidewall. The loading device is pivotal from a storage position to a transfer position, so that the roll of wrapping material can be pushed from the loading device into the unwind station.

19 Claims, 3 Drawing Sheets

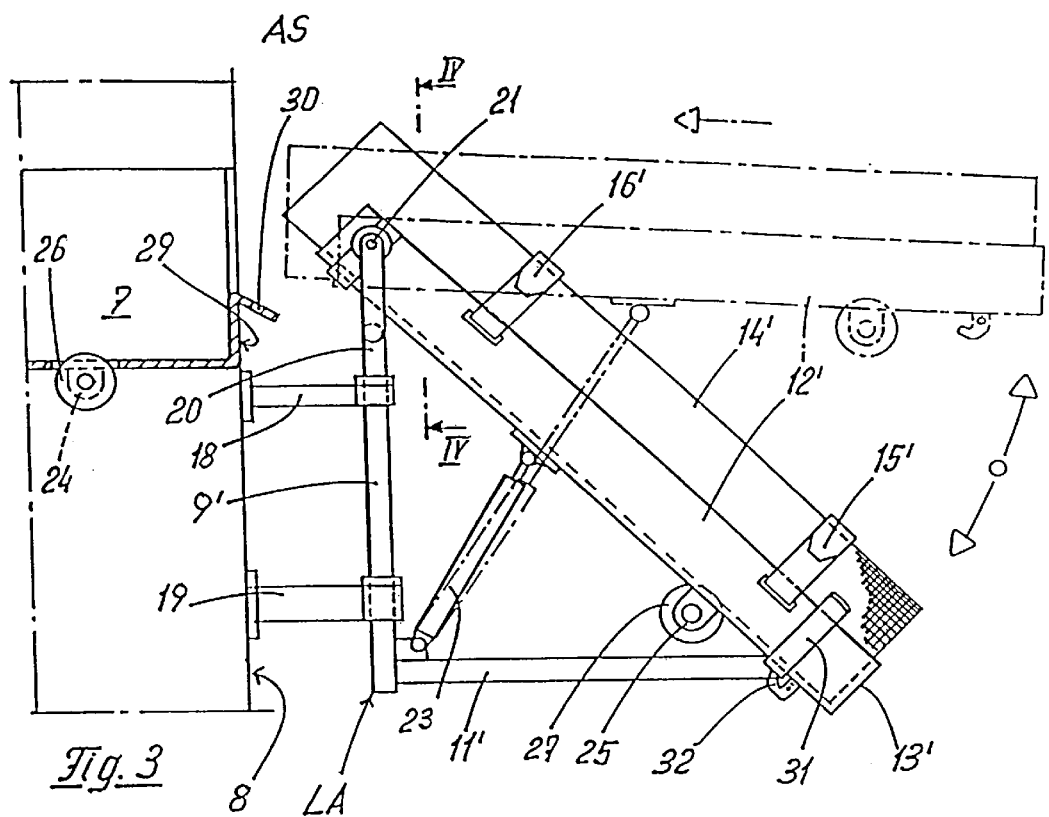
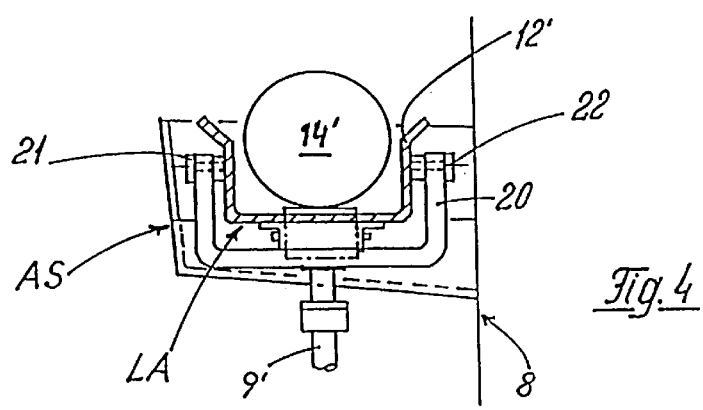

DEVICE FOR LOADING BALE WRAPPING ROLLS

BACKGROUND OF THE INVENTION

The present invention relates generally to agricultural machinery and, more particularly, to improvements to balers for harvested crops.

Round balers have a baling chamber defined by baling rollers. An opening adjacent the baling chamber directs a web of wrapping material toward the baling chamber for wrapping the bale. The web of wrapping material is provided in a cylindrical roll and stored in an unwind station on the baler adjacent the baling chamber. Such unwind stations may be of any type well known in the art, from where the web material is pulled off a roll. The roll may be freely supported at the unwind station or by means of a device inserted at the ends, which allows the roll to rotate.

Placement of the roll of wrapping material into the unwind station is presently done exclusively by hand, whereby the baler must be climbed upon via raised footsteps. Depending on the location of the baler's unwind station, a lot of physical strength is required because the roll of wrapping material weighs approximately 40 kg. or 88 lbs.

It would be advantageous to provide an arrangement which overcomes the deficiencies described above.

An objective of this invention is to provide a device for aiding the loading of a roll of wrapping material into the unwind station. Another object is to provide a device which is also usable for storing a roll of wrapping material. Still another object of the invention is to provide a device which is movable from a storage position to a transfer position for loading the unwind station.

SUMMARY OF THE INVENTION

In accordance with the present invention there is provided a round baler for baling harvested crops and having a plurality of bailing rollers which define a baling chamber, an unwind station adjacent the baling chamber for storing a roll of wrapping material, an opening through which the wrapping material is directed toward the interior of the baling chamber for wrapping the bale; a loading device mounted adjacent the unwind station for receiving a roll of the wrapping material and for transferring the roll to the unwind station.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 3 is an enlarged partial cross-sectional view of the baler shown in FIG. 2 and showing another embodiment of the loading device in elevation; and FIG. 4 is a cross-section taken along line IV—IV of FIG. 3, and on a still larger scale.

DETAILED DESCRIPTION

Figure 1:
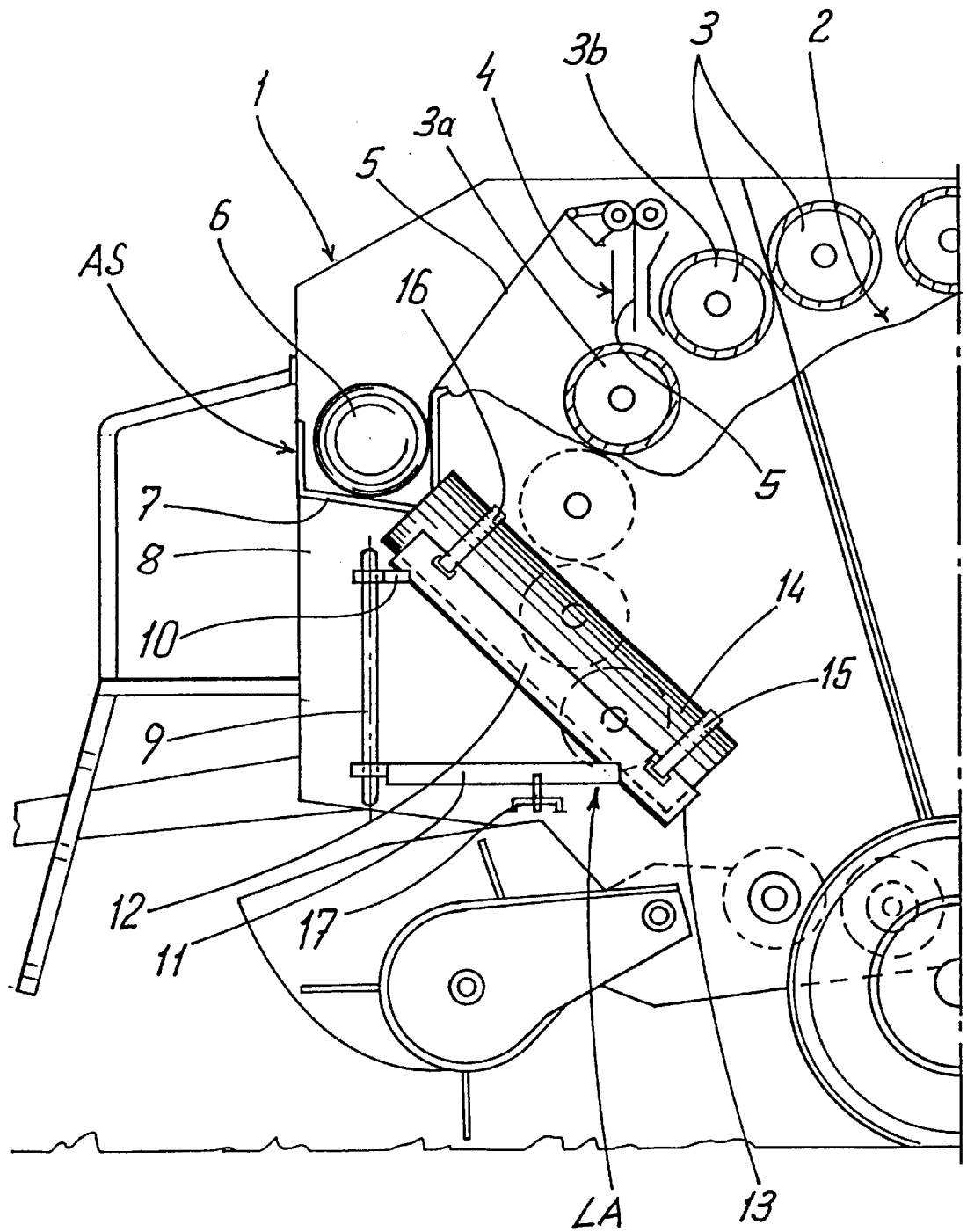
FIG. 1 is a side elevation of the front portion of a baler with a portion broken away for a better illustration of the parts, and showing a first embodiment of a loading device thereon.

FIG. 1 shows a front portion of a baler 1 having a bale forming chamber 2 which is defined circumferentially by driven and, if necessary, surface structured baling rollers 3. Instead of rollers, the bale forming chamber 2 can also be defined by endless belts (not shown) or a combination of belts and rollers 3. A guiding device diagrammatically shown at 4 is disposed above two baling rollers 3a and 3b which define an opening or passageway for a web 5 of wrapping material to be introduced into the bale forming chamber 2. In the chamber the web 5 engages and wraps a rotating bale to thereafter maintain the shape of the bale. The web 5 is pulled off a supply roll 6 in an unwind station AS which, for example, is disposed in a housing 7. The housing 7 extends crosswise of the baler 1 so that the rotational axis of the roll 6 is parallel to the rotational axis of the bale forming chamber 2.

A loading device LA is located adjacent the unwind station AS. The loading device includes a vertically disposed axis defined by member 9 connected to a sidewall 8 of the baler 1. An upper support arm 10 and a lower support arm 11 are pivotally mounted on the member 9 and support a trough 12. As shown in FIG. 1, the upper support arm 10 is shorter than the lower support arm 11. This allows trough 12 to be supported in an inclined position. The trough 12 is closed at its lower end by a wall 13 to support a stored roll of wrapping material 14 which, as shown in FIG. 1, serves as an additional supply roll. Securing devices in the form of straps 15, 16 hold the stored roll 14 in the trough 12. Arm 11, as shown in FIG. 1, may be locked in a storage position via a locking device 17. In the FIG. 1 embodiment, trough 12 is fixed to the arms 10 and 11. As soon as supply roll 6 is used up, the locking device 17 is disengaged and trough 12 is pivoted from the storage position of FIG. 1 into the transfer position shown in FIG. 2. After loosening the straps 15 and 16, an operator can readily push the stored roll 14 of wrapping material from the trough 12, through the positions shown in phantom lines in FIG. 2, and into the housing 7, i.e. unwind station AS. After the roll 14 is transferred into the unwind station AS, the trough can again be locked in place.

An even more user-friendly embodiment is illustrated in FIGS. 3 and 4 where similar parts are indicated by the same numerals followed by the postscript prime ('). Here, member 9' is pivotally mounted in support brackets 18 and 19, which are attached to the side wall 8, lower support arm 11' is attached to member 9'. At the distal end of arm 11' is a supporting bracket 31 in the form of a fork or U-shaped bracket for loosely supporting the lower end of trough 12'. In the position shown in FIG. 3, trough 12' can be coupled to the supporting bracket 31, via a locking device 32. On its lower end, the trough also has a support wall 13'. The upper end of trough 12' is mounted by a forked bracket 20. The legs of the forked bracket 20 are connected to the trough 12' via pivot pins 21 and 22. The fork bracket 20 itself is secured to the upper end of member 9'. To aid in pivoting the trough 12' from the position illustrated in solid lines in FIG. 3 into the position illustrated by phantom lines, a cylinder unit 23 is provided. The unit may be a pneumatic cylinder whose head end is operatively connected to member 9' and its rod to trough 12'. The spare roll 14' of wrapping material is held by straps 15' and 16' during transport and during work in the field.

Further devices are provided to simplify the transfer of the spare roll 14' from trough 12' into the unwind station AS. Flanges 24 and 25 are welded on the outside of the trough 12' and the base of housing 7, on each side of openings in the trough 12' and housing 7. Rollers 26 and 27 are located in the openings and pivotally mounted on flanges 24 and 25, respectively. These rollers 26 and 27 extend through the openings far enough that the spare roll 14' can rest on them.

During transfer from trough 12' into the housing 7, the spare roll 14' rolls over the rollers 26 and 27. For simplification only one roller is shown for the trough 12' and the housing 7; however multiple rollers may be utilized.

To prevent the spare roll 14' from hitting a wall 29 of the housing during transfer, the wall has an opening as shown in FIG. 3 and is equipped with a lip or guiding plate 30.

Figure 2:
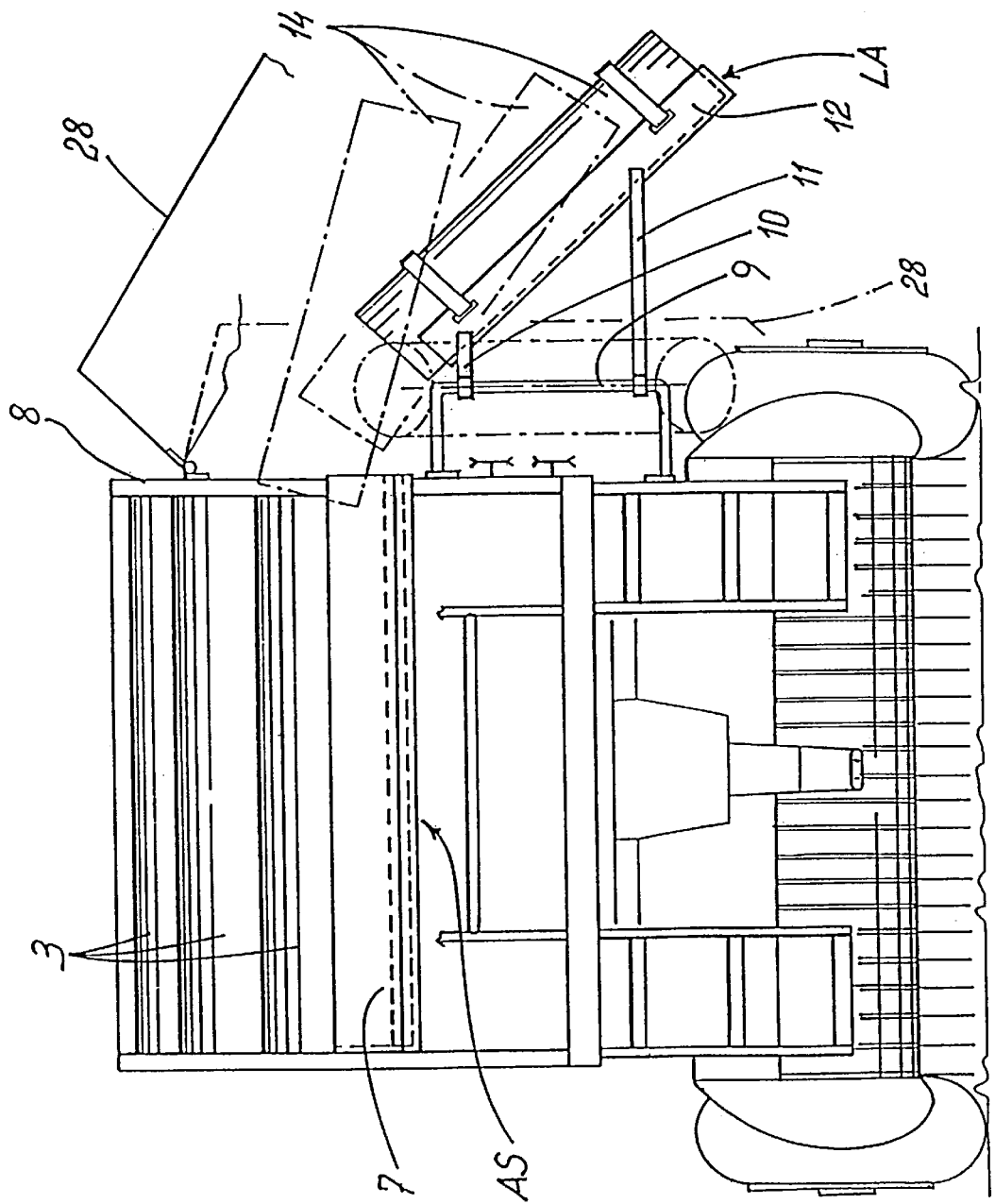
FIG. 2 is a front view of the baler shown in FIG. 1.

Trough 12' is pivotable through 90°, the same as trough 12, so that it can assume a storage position adjacent the sidewall 8 of the baler 1. In a retracted condition, i.e. in the storage position, the troughs 12 or 12' are covered by a cover or shield 28 as shown in FIG. 2, both in solid and phantom lines.

In accordance with the present invention, several rolls of twine may be substituted for the roll of wrapping material. This is advantageous if a completed bale should be tied with twine instead of being wrapped with a web of wrapping material. In the spirit of the invention, it can also be appreciated that a string of twine can be unwound directly from a roll of twine in the trough through appropriate guiding devices into the baling chamber.

In the illustrated example, the loading device LA is shown in the front area of the sidewall 8 of a baler. One may alter the arrangement so that the loading device LA can be mounted operationally at either the front or back side of the baler.

Other objects, features and advantages will be apparent to those skilled in the art. While preferred embodiments of the present invention have been illustrated and described, this has been by way of illustration and the invention should not be limited except as required by the scope of the appended claims.

We claim:

1. In a round baler for baling harvested crops and having a plurality of baling rollers which define a baling chamber, an unwind station adjacent the baling chamber for storing a roll of wrapping material having a longitudinal axis, the baling chamber having an opening through which the wrapping material is directed toward the interior of the baling chamber for wrapping the bale; the improvement comprising:

a loading device mounted adjacent and operatively connected to the unwind station for receiving a roll of the wrapping material having opposite ends and supporting the roll on one of said ends, and for transferring the roll to the unwind station by moving the roll along the longitudinal axis of the roll into the unwind station.

2. A round baler according to claim 1, including means for mounting the loading device for rotation from a storage position at the side of the baler to a transfer position removed from the storage position.

3. A round baler according to claim 2, including means for locking the loading device at the storage position.

4. A round baler according to claim 2, wherein said means for mounting mounts the loading device for rotation about a generally vertical axis.

5. A round baler according to claim 1, including a transfer mechanism for rotating the loading device about a generally horizontal axis for transferring the roll to the unwind station.

6. A round baler according to claim 1, wherein said loading device includes a trough having upper and lower ends and a wall at the lower end thereof for supporting the roll of wrapping material.

7. A round baler according to claim 6, including means for mounting the trough for rotation about a generally vertical axis.

8. A round baler according to claim 7, wherein the means for mounting the trough includes upper and lower spaced arms.

9. A round baler according to claim 8, wherein the lower arm is longer than the upper arm.

10. A round baler according to claim 9, including means for mounting the loading device for rotation from a storage position at the side of the baler to a transfer position generally perpendicular to the side of the baler, and means for locking the device at the storage position.

11. A round baler according to claim 10, including a cover for the loading device at the storage position, and means for pivotally mounting the cover adjacent the loading device.

12. A round baler according to claim 6, including means for holding the roll of wrapping material in the trough.

13. A round baler according to claim 6, including a bracket at the upper end of the trough, and means for pivotably mounting the trough to the bracket.

14. A round baler according to claim 13, including a second bracket at the lower end of the trough, and means for supporting the trough on the second bracket.

15. A round baler according to claim 13, including a pneumatic actuator connected to the trough for pivoting the trough to a transfer position from which the roll of wrapping material may be transferred to the unwind station.

16. A round baler according to claim 14, wherein said second bracket is forked, and wherein the loading device includes an upright member and an arm interconnecting the upright member and the forked bracket.

17. A round baler according to claim 6, wherein the trough has at least one opening therein and including a roller in the opening for aiding the movement of the roll of wrapping material.

18. A round baler for baling harvested crops and having a plurality of baling rollers which define a baling chamber, an unwind station adjacent the baling chamber for storing a roll of wrapping material, the roll having opposite ends and a longitudinal axis, the baling chamber having an opening through which the wrapping material is directed toward the interior of the baling chamber for wrapping the bale, and a loading device mounted adjacent the unwind station for storing another roll of the wrapping material by supporting said other roll at least in part on one of the opposite ends and for transferring said other roll to the unwind station by moving said other roll along its longitudinal axis with the other one of the opposite ends leading as the roll of wrapping material is moved.

19. A round baler according to claim 18, wherein the loading device includes a trough which is inclined to the horizontal at a storage position at the side of the baler to a transfer position generally perpendicular to the side of the baler and having upper and lower ends, and a wall at the lower end for supporting the roll at the storage position; and including means for mounting the trough for rotation about generally upright and horizontal axes for movement between the storage position and a transfer position generally perpendicular to the side of the baler, and means for releasably locking the trough at the storage position.

* * * * *